United States Patent [19]

Schiffner

[11] 4,325,636
[45] Apr. 20, 1982

[54] INTERFEROMETER WITH A SINGLE-MODE WAVEGUIDE COIL

[75] Inventor: Gerhard Schiffner, Munich, Fed. Rep. of Germany

[73] Assignee: Siemens Aktiengesellschaft, Berlin & Munich, Fed. Rep. of Germany

[21] Appl. No.: 2,537

[22] Filed: Jan. 11, 1979

[30] Foreign Application Priority Data

Jan. 31, 1978 [DE] Fed. Rep. of Germany ....... 2804119

[51] Int. Cl.³ .......................... G01B 9/02; G02B 5/14
[52] U.S. Cl. ............................... 356/350; 350/96.15; 356/351
[58] Field of Search .................... 356/350, 351; 350/96.15

[56] References Cited

U.S. PATENT DOCUMENTS

| | | | |
|---|---|---|---|
| 3,395,270 | 7/1968 | Speller | 356/350 |
| 3,743,962 | 7/1973 | Rosenberg | 331/94.5 |
| 4,039,260 | 8/1977 | Redman | 356/106 |
| 4,054,366 | 10/1977 | Barnoski | 350/96.15 |
| 4,136,929 | 1/1979 | Suzaki | 350/96.15 |
| 4,138,196 | 2/1979 | Redman | 356/350 |

OTHER PUBLICATIONS

"Fresnel–Fizeau Effect in a Rotating Optical Fiber Ring Interferometer", Vali et al., Applied Optics, vol. 16, #10, Oct. 1977, p. 2605.
"Sagnac Effect", Post, Review of Modern Physics, vol. 39, #2, 4/67, pp. 475–493.
"Ring Interferometer 950 Meters Long", Vali and Shorthill, Applied Optics, vol. 16, No. 2, 2/77, p. 290.
Bendow et al., *Fiber Optics,* Plenum Press, New York, 1979, pp. 473–478.
Y. Tsujimoto et al., "Fabrication of Low-Loss 3dB Couplers with Multimode Optical Fibers" in *Electronics Letts.,* vol. 14, No. 5, Mar. 1978, pp. 157–158.

*Primary Examiner*—John K. Corbin
*Assistant Examiner*—Bruce Y. Arnold
*Attorney, Agent, or Firm*—Hill, Van Santen, Steadman, Chiara & Simpson

[57] ABSTRACT

An interferometer with a single-mode optical waveguide wound in a coil which waveguide has a surface at each end for the acceptance of the light into the waveguide ends and for the display of light in the waveguide characterized by an improvement comprising at least one optical directional coupler having four input/output ends being provided. One of the four input/output ends is coupled into one of the pair of ends of the waveguide forming the coil and a second of the input/output ends is coupled to the other end of the pair of ends of the waveguide forming the coil. Preferably, the coupling of light from a light source utilizes a second additional directional coupler, which has an input/output end coupled to a third input/output end of the first mentioned coupler and the device preferably has a pair of light sensitive elements with one of said elements receiving a superimposed image from the fourth input/output end of the first mentioned coupler and the other receiving light from one of the input/output ends of the second or additional coupler.

5 Claims, 2 Drawing Figures

INTERFEROMETER WITH A SINGLE-MODE WAVEGUIDE COIL

BACKGROUND OF THE INVENTION

1. Field of the Invention

The present invention is directed to an interferometer with a single-mode optical waveguide wound in a coil which waveguide has a surface at each end for accepting light into the waveguide and for displaying light traveling in the waveguide.

2. Prior Art

Interferometers, which utilize a single-mode waveguide such as a fiber wound in a coil are known and described in an article by V. Vali, R. W. Shorthill and M. F. Berg, "Fresnel-Fizeau Effect in a Rotating Optical Fiber Ring Interferometer", *Applied Optics*, Vol. 16, No. 10, October 1977, pp. 2605–2607. These interferometers can be applied with the exploitation of the Sagnac-effect for the measurement of angular velocities. To that end, linearly polarized light is coupled into the waveguide by its acceptance surface so that light travels in the guide in both directions. By means of superimposing the light emerging from the two ends or display surfaces of the fiber, an interference pattern can be generated whose proportional intensity distribution produces information concerning the movement state of the coil relative to an inertial system. The positional distribution of the light intensity is a function of the mutual phase amplitude of the light rays emerging from the light display or end surfaces of the waveguide. If the coil is at rest with respect to the inertial system, then the transmit time of the two light beams traveling in the fiber in opposite directions are exactly equal since no non-reciprocal effects occur in the waveguide. If the coil turns in relation to the inertial system, then because of the relative Sagnac-effect, which is explained by an article by E. J. Post, "Sagnac Effect", *Reviews of Modern Physics*, Vol. 39, No. 2, April 1967, pp. 475–493, a transit time difference, which is different from zero, occurs and the phase amplitude of the light beams emerging from the display surfaces of the fiber are no longer the same. By evaluating the positional intensity distribution in the superposition range of the light beams, rotational velocity of the coil can be determined. Single-mode waveguides are used because a straight forward light path is provided therein. A single-mode waveguide is understood to be a waveguide which conducts or can only conduct a single mode of light.

Up to now in known interferometers, beam divider mirrors or beam splitting cubes have been used for coupling the light into the waveguide and for processing the light emerging from the waveguide. Therefore, traditional interferometers have large scale mechanical structures so that the systems become large, heavy and expensive to manufacture.

SUMMARY OF THE INVENTION

The object of the present invention is to provide an interferometer of the type having a waveguide such as a fiber wound in a coil which interferometer requires a significantly smaller expenditure for manufacture than the traditional known interferometers.

To accomplish this task, the present invention is directed to an improvement in an interferometer with an optical single-mode waveguide wound into a coil, said waveguide having a surface at each end for the acceptance of light into the waveguide and for the display of light emerging from the waveguide. The improvement comprises at least one directional coupler having four input/output ends being provided, one of said four input/output ends being coupled into one end of the waveguide and a second of the input/output ends being coupled onto the other end of the waveguide.

Let it be understood that by optical directional couplers in general, a reciprocal quadrupole with the already mentioned four input/output ends is meant. The term input/output end is used because each end can be used as an input and also as an output. A realization of the optical directional coupler consists of two coupling waveguides, which extend parallel for a given distance with the distance between the two parallel guides being a small interval so that light from one waveguide can be coupled into the other waveguide. Light can be coupled in and out at both ends of each coupling waveguide. The total four ends of the coupling waveguides thus form the four input/output ends of the optical directional coupler. Therefore, let it be understood that here and in the following description that the term optical directional coupler means, an optical quadrupole which exhibits the properties of specific embodiments of an optical directional coupler just described and indeed independently of its construction.

The preferred embodiment is characterized by the light source generating at least a partially coherent light. Preferably, the light source is a laser and creates polarized light.

In a preferred embodiment of the interferometer, a third input/output end of the optical directional coupler is coupled to a light source via means for coupling light from a light source. The means for coupling preferably comprises an imaging means for purely real imaging of the light source including imaging optics and an additional optical directional coupler which has four input/output ends. The additional directional coupler has one input/output end coupled to the third input/output end of the first mentioned directional coupler with the second input/output end of the additional directional coupler being coupled to the light source. The third input/output end of the additional directional coupler preferably lies opposite a light absorber.

In an advantageous embodiment of the interferometer, the fourth input/output end of the first mentioned directional coupler lies opposite a light emergent window of a light sensitive window such as a photo diode so that superimposed images from the two ends of the waveguides are directed as a superimposed image. When the additional optical directional coupler is utilized, its fourth input/output end lies opposite a light entrance window of an additional light sensitive element.

The means for coupling also preferably includes means for providing a magnified observation of an input/output end of the additional coupler so that the coupling of the light from the source therein can be observed.

A practical embodiment of the proposed interferometer is designed in such a way that at least one optical directional coupler is built up of two coupling light guides. These two coupling waveguides are expediently single-mode fibers.

By using optical directional couplers in the design of an interferometer having a waveguide coil, the expenditure of the construction and the mechanics of the device are greatly reduced. Thus, the structure of the invention results in a great reduction in cost.

DESCRIPTION OF THE PREFERRED EMBODIMENTS

Figure 1:
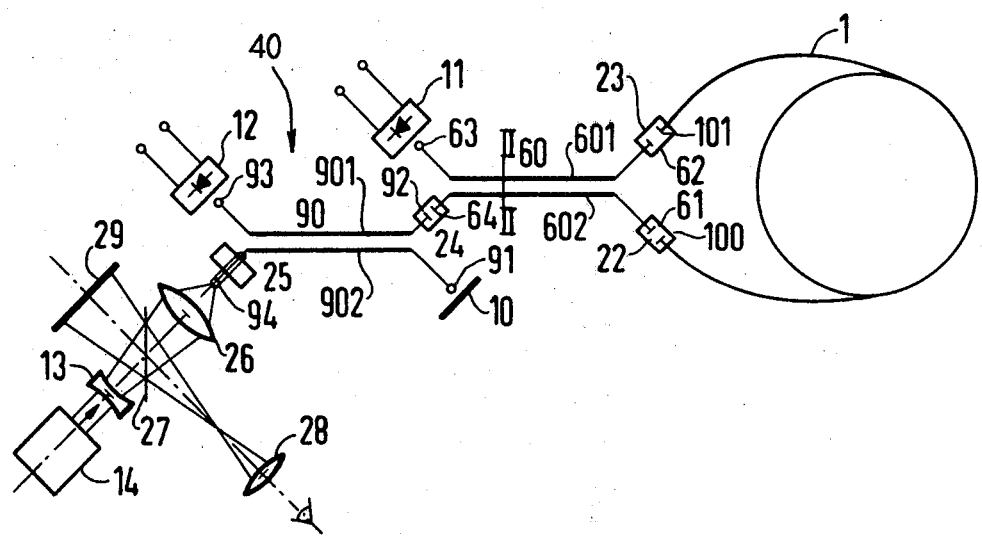
FIG. 1 is a diagrammatic illustration of an interferometer in accordance with the present invention.

The principles of the present invention are particularly useful when embodied in an interferometer generally indicated at 40 in FIG. 1. As illustrated, interferometer 40 includes a single-mode waveguide such as an optical fiber 1, which is wound into a coil and has its ends designated at 100 and 101, respectively. Each of these ends form surfaces for accepting light being coupled into the waveguide 1 and for output coupling or displaying light exiting or emerging from the waveguide 1.

An optical directional coupler 60 has four input/output ends 61, 62, 63 and 64. An additional optical directional coupler 90 has four input/output ends 91, 92, 93 and 94. Directional coupler 60 is constructed of two coupling waveguides 601 and 602 and the optical directional coupler 90 is constructed of two coupling waveguides 901 and 902. The input/output ends 62, 63 of the coupler 60 are formed by the ends of the coupling waveguides 601 and the input ends 61 and 64 formed by the coupling waveguide 602. In a similar manner, the additional coupler 90 has the input/output ends 91, 93 formed by the waveguide 901 while 91 and 94 are the ends of the waveguides 902.

The input/output end 61 is coupled to the end 100 of the waveguide 1 while the end 62 is coupled onto the end 101. Plugs 22 and 23, respectively, are provided as the coupling elements. The third end 64 of the directional coupler 60 is coupled onto an input/output end 92 of the additional directional coupler 90 so that a portion, such as a waveguide 901 of the coupler 90, is connected in series with the waveguide 602 of the coupler 60. The connection of ends 92 and 64 is accomplished by plug 24, which serves as the connecting or coupling element. The coupling waveguides and the plugs are preferably single-mode waveguides and single-mode plugs.

A light absorber 10 lies opposite the second input/output end 91 of the directional coupler 90. The third input/output end 94 of the directional coupler 90 is provided for coupling light into the coupling 90. This end 94 is secured in a fiber holding adjustment installation 25, which forms part of the means for coupling light into the optical coupler 60.

To provide light into the device 40, a light source 14, such as a laser, produces a beam which passes through an expansion optic 13, a beam splitting or dividing element 27 and a collecting optic or lens 26, which focuses the beam onto the end 94 of the waveguide 902 of the coupler 90. The expansion optic 13 and the collecting object 26 provide means for forming a real image of the light source 14 on the coupling surface of the end 94 and form the imaging optics of this means.

The beam divider element 27 is a mirror, which is arranged in the beam path of the light beam between the expansion object 13 and the collecting optic or lens 26. This part of the optical installation enables a magnified observation of the input/output coupling surface of end 94. This means for observing in a magnified fashion the input coupling includes besides the collecting optic 26, a light absorber 29 and an ocular 28. The light absorber is arranged on the side of the beam divider mirror 27 onto which the light irradiates from the light source is reflected away from the beam divider. The ocular 28 lies on the opposite side of the beam divider to receive light reflected through the lens 26.

The light entrance window of a light sensitive element 11 is arranged or positioned opposite the fourth input/output end 63 of the optical directional coupler 60. Also, the light entrance window of an additional light sensitive element 12 lies opposite the fourth input/output end 93 of the additional optical directional coupler 90. Each of these light sensitive elements 11 and 12, which may be photo diodes, will receive a superimposed image of the light emerging from both ends 100 and 101 of the waveguide 1.

Figure 2:
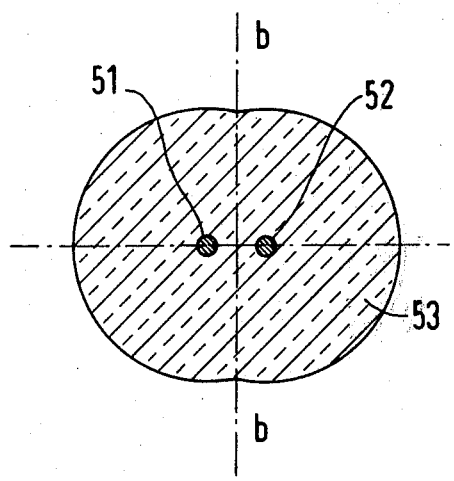
FIG. 2 is a cross section through an embodiment of the optical directional coupler taken along lines II—II of FIG. 1.

In FIG. 2, a cross section through an optical directional coupler 60 or 90 is represented and, as illustrated, is taken along line II—II of FIG. 1. This cross section illustrates two single-mode core fibers 51 and 52 which both exhibit a diameter in the magnitude of 5 $\mu$m. The interval of the two core fibers from one another lies in the same magnitude. Both core fibers are surrounded by a common sheath 53 of sheath or cladding glass. The directional coupler is divisible along a line b—b of FIG. 2 in order to be able to form the input/output ends for the individual couplers in a simple manner. Such a directional coupler can be simply produced by means of a double crucible process. To that end, a large jet is used in the outer crucible for the sheath or cladding glass and two smaller jets are used in the inner crucible for the core glass.

Although various minor modifications may be suggested by those versed in the art, it should be understood that I wish to embody within the scope of the patent warranted hereon, all such modifications as reasonably and properly come within the scope of my contribution to the art.

I claim:

1. In an interferometer having a light source and a single-mode optical waveguide wound into a coil, said coiled waveguide having a surface at each end for acceptance of light into the waveguide and for the displaying of light in the waveguide, the improvements comprising a first optical directional coupler and an additional optical directional coupler, each of said optical directional couplers having four input/output ends with a pair of input/output ends at each end of the coupler, said first coupler having one input/output end of one pair of ends being axially coupled to one of said end surfaces of said coiled waveguide and a second input/output end of the one pair being coaxially coupled to the other of said end surfaces of said coiled waveguide, said first coupler having one end of the other pair of ends being coupled to a first light sensitive element and the other end of the other pair of ends being coupled to one end of a first pair of ends of the additional optical directional coupler, the other end of the first pair of ends of the additional directional coupler being closed by a light absorber, said additional optical directional coupler having one end of a second pair of ends being coupled to a second light sensitive element; and means for coupling said light source to a second end of the second pair of ends of the additional optical directional coupler, said means for coupling including imaging means for forming a real image of the light source on said second end said imaging means including imaging optics, and said means for coupling including means for making a magnified observation of the input coupling of light into the second end of the additional coupler.

2. In an interferometer according to claim 1, wherein the light source generates partially coherent light.

3. In an interferometer according to claim 2, wherein the light source comprises a laser.

4. In an interferometer according to claim 1, wherein the light source generates polarized light.

5. In an interferometer according to claim 1, wherein each of said optical directional couplers comprises two coupling waveguides extending parallel to each other for a given distance with the spacing between the two parallel coupling waveguides being a small interval to allow light in the coupling waveguides to be coupled therebetween, said two parallel coupling waveguides having ends forming said two pairs of input/output ends of the coupler.

* * * * *